United States Patent [19]

Kagata et al.

[11] Patent Number: 5,094,987

[45] Date of Patent: Mar. 10, 1992

[54] DIELECTRIC CERAMIC COMPOSITION AND MULTI-LAYER CAPACITOR

[75] Inventors: Hiroshi Kagata, Katano; Junichi Kato, Osaka; Youichiro Yokotani, Suita; Koichi Kugimiya, Toyonaka, all of Japan

[73] Assignee: Matsushita Electric Industrial Co., Ltd., Osaka, Japan

[21] Appl. No.: 569,291

[22] Filed: Aug. 17, 1990

[30] Foreign Application Priority Data

Aug. 17, 1989 [JP] Japan .................................. 1-211594
Feb. 26, 1990 [JP] Japan .................................. 2-44912
Feb. 26, 1990 [JP] Japan .................................. 2-44913

[51] Int. Cl.$^5$ .............................................. C04B 35/46
[52] U.S. Cl. .................................... 501/136; 501/138; 501/139; 361/321
[58] Field of Search ........................ 501/136, 138, 139; 361/321

[56] References Cited

U.S. PATENT DOCUMENTS

| | | | |
|---|---|---|---|
| 4,222,783 | 9/1980 | Atsumi et al. | 501/138 |
| 4,753,905 | 6/1988 | Nishioka et al. | 501/136 |
| 4,818,736 | 4/1989 | Yamashita et al. | 501/136 |
| 4,882,078 | 11/1989 | Nishimura et al. | 501/136 |
| 4,882,652 | 11/1989 | Furukawa et al. | 501/136 X |
| 4,959,333 | 9/1990 | Mori et al. | 501/136 |

FOREIGN PATENT DOCUMENTS

| | | | |
|---|---|---|---|
| 238241 | 9/1987 | European Pat. Off. . | |
| 3541517 | 5/1986 | Fed. Rep. of Germany . | |
| 0004280 | 1/1974 | Japan | 501/134 |
| 0031905 | 2/1987 | Japan | 501/138 |

OTHER PUBLICATIONS

"Chemical Abstracts", vol. 107(18), col. 167105(c) Nov. 1987.
"Chemical Abstracts", vol. 108(6), col. 47724(c) Feb. 1988.

*Primary Examiner*—Karl Group
*Attorney, Agent, or Firm*—Wenderoth, Lind & Ponack

[57] ABSTRACT

Dielectric ceramic composition consisting essentially of substance selected from those represented by the following formula:

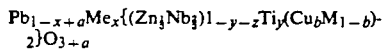

wherein Me is at least one element selected from Sr and Ba; M is at least one element selected from Nb, Ta and W; x and y are within the scope shown in FIGS. 1, 3 or 2; and $0 \leq a \leq 0.1$, $0.02 \leq b \leq 1.0$, $0.002 \leq bz \leq 0.04$.

Multi-layer capacitors having dielectric layers made of the dielectric ceramic composition exhibit a good temperature coefficient of capacitance.

4 Claims, 3 Drawing Sheets

DIELECTRIC CERAMIC COMPOSITION AND MULTI-LAYER CAPACITOR

BACKGROUND OF THE INVENTION

This invention relates to a dielectric ceramic composition for a multi-layer capacitor comprising internal electrodes mainly containing Cu or Cu alloys and dielectric layers mainly containing Pb based perovskite ceramics, particularly relates to a composition having a small temperature coefficient of capacitance which is in the range of Y-class B-characteristic of JIS (Japanese Industreal Standard) which has the temperature change ratio variation from $-25°$ C. to $85°$ C. within $\pm 10\%$ based on a value of $20°$ C.

Recently, multi-layer capacitors have been mainly used in the electric circuits of various electric products to meet need of small-sized and large-capacitance capacitors. Such multi-layer capacitors are usually made by co-sintering internal electrodes and dielectric ceramic body. Conventionally a ceramic composition comprising barium titanate system is widely used as dielectric materials for a ceramic capacitor having a high dielectric constant. However, since such barium titanate ceramics are sintered at a temperature as high as about $1300°$ C., it is required to use metals such as Pd, Pt and the like which have a high cost and a high electric resistance, for internal electrodes of multi-layer capacitors. Further, owing to inferiority in DC bias and signal voltage characteristics, dielectric layers of barium titanate ceramics can not get thinner in order to make a capacitor small-sized and have large capacitance.

Therefore, a multi-layer capacitor comprising internal electrodes made of Cu having a low cost and a low electric resistance and dielectric layers made of Pb based perovskite ceramics having a good voltage characteristic and a low sintering temperature is strongly desired. There has also been proposed a dielectric ceramic composition which has practical electric characteristics and is able to be sintered together with Cu, that is, sintered under a condition in which Cu can not be melted or oxidized. Furthermore, we have proposed a method by which the above multi-layer capacitor can be mass-produced. Therefore, a multi-layer capacitor having a good commercial cost and larger capacitance although it is small-sized, is realized so that electrolytic capacitors can be replaced by the multi-layer capacitors.

However, the multi-layer capacitor proposed up to the present time has a poorer temperature coefficient of capacitance (corresponding to JIS Y E characteristic), so that thus produced capacitor can be used only to a limited extent. Therefore, it is desired to develop a superior capacitor has large capacitance which meet the above Y B-characteristic which has the temperature change ratio from $-25°$ C. to $85°$ C. within $\pm 10\%$ based on a value of $20°$ C. However, there has not been yet developed a capacitor having a practical level in CR product, voltage characteristic and the like.

SUMMARY OF THE INVENTION

Therefore, the first object of the present invention is to provide a dielectric ceramic composition for multi-layer capacitors which meet the above requirements.

Further, the second object of the present invention is to provide a multi-layer capacitor which meet the above requirements.

In accordance with this invention, there is provided a dielectric ceramic composition essentially consists of one or more substances selected from those represented by the following formulas:

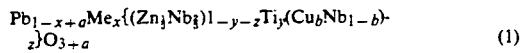  (1)

wherein Me is at least one element selected from Sr and Ba; x and y are in the scope enclosed by 5 points A(x=0.07, y=0.15), B(x=0.07, y=0.07), C(x=0.16, y=0.07), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 1;

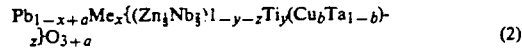  (2)

wherein Me is at least one element selected from Sr and Ba; x and y is in the scope enclosed by 5 points A(x=0.07, y=0.14), B(x=0.07, y=0.08), C(x=0.18, y=0.08), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 3;

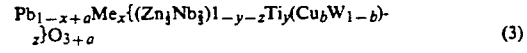  (3)

wherein Me is at least one element selected from Sr and Ba; x and y are in the scope enclosed by 5 points A(x=0.07, y=0.16), B(x=0.07, y=0.09), C(x=0.19, y=0.09), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 2;

In the dielectric ceramic composition according to the invention, it is preferable that at most 85% of Cu atoms included therein are substituted by Mn atoms, since an absolute insulation resistivity is increased.

According to the above inventive dielectric ceramic composition, the amount of A site in the perovskite phase represented by the formula $ABO_3$ is over the stoichiometric amount, so that an insulation resistivity is not lowered even if the composition has been sintered under a low oxygen partial pressure. Furthermore, the B site of the perovskite phase contains Cu, so that the composition can be sintered at a lower temperature and becomes to have a small temperature coefficient of dielectric constant.

In accordance with this invention, therefore, there is also provided a multi-layer capacitor comprising dielectric ceramic layers essentially consists of one or more substances selected from those represented by the above formulas (1), (2) and (3).

BRIEF DESCRIPTION OF THE DRAWINGS

FIG. 1 is a composition diagram of

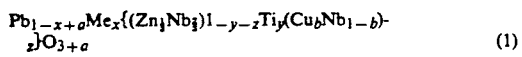  (1)

Figure 3:
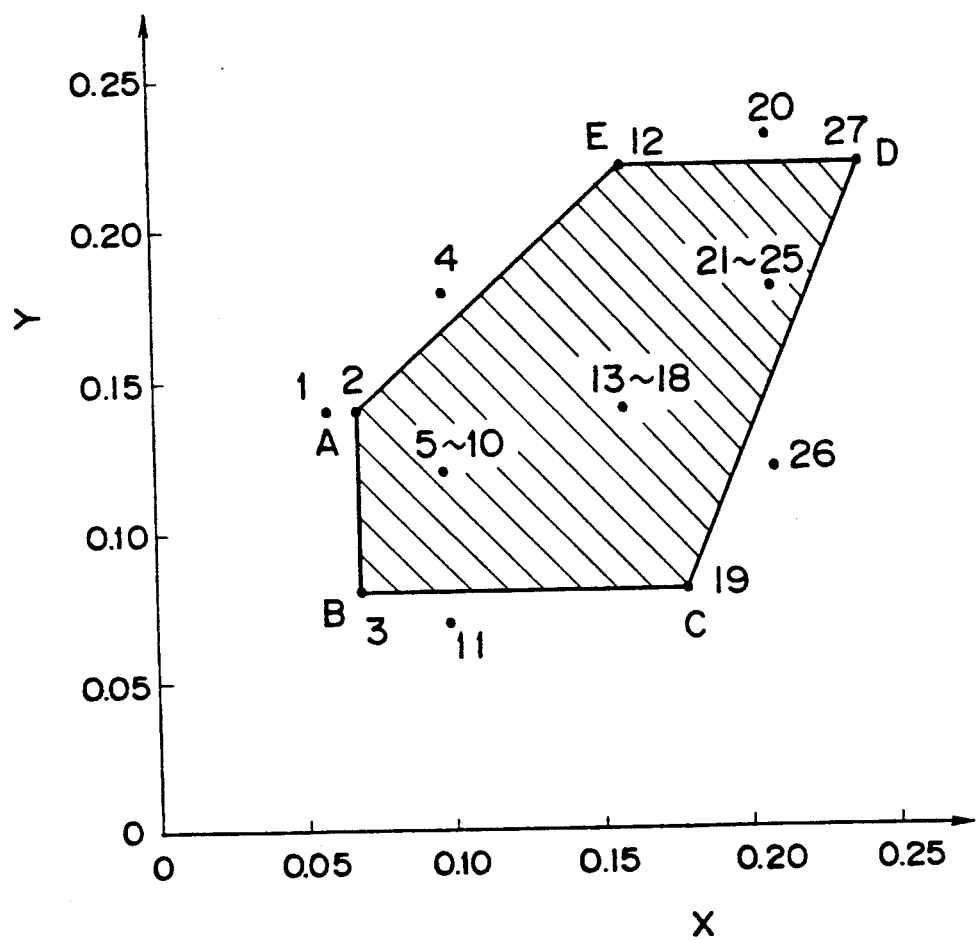

in accordance with the present invention.
FIG. 3 is a composition diagram of

Figure 2:
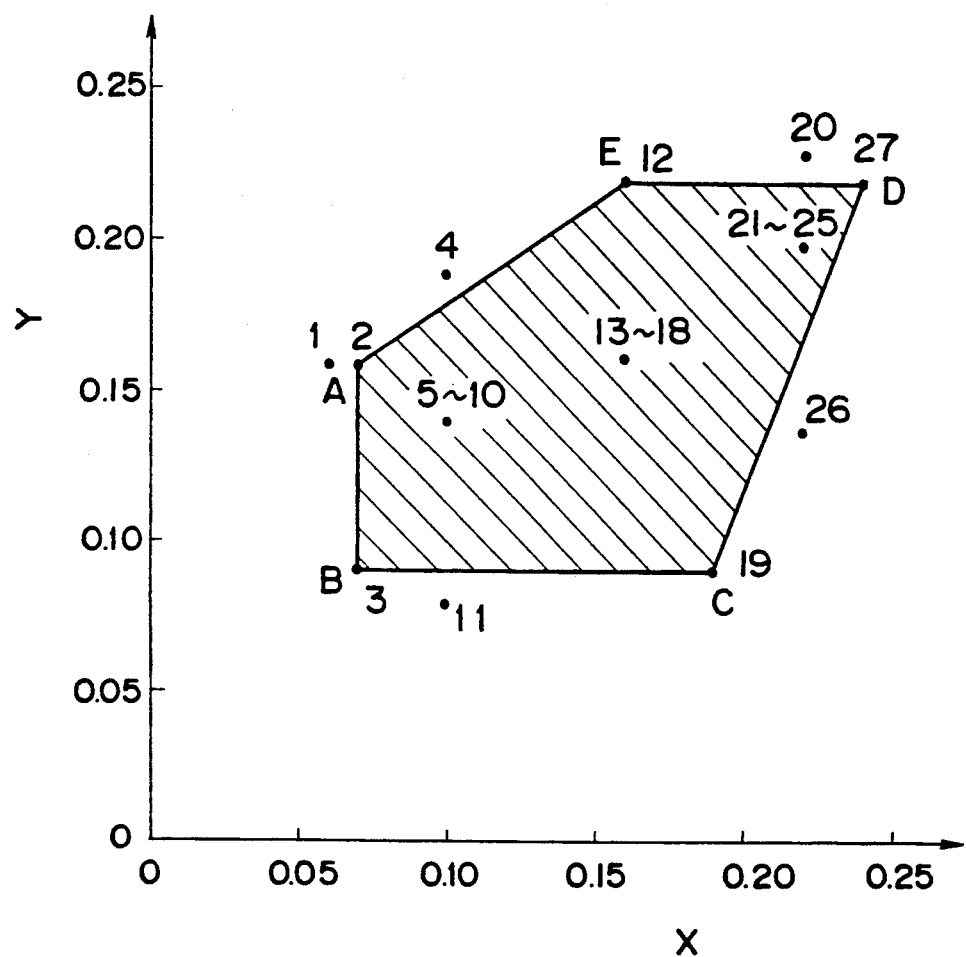

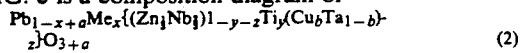  (2)

in accordance with the present invention.
FIG. 2 is a composition diagram of

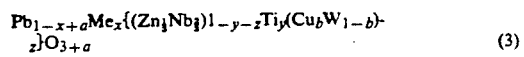  (3)

DETAILED DESCRIPTION OF THE INVENTION

The composition herein may be prepared in accordance with various well-known ceramic procedures.

EXAMPLE 1

A multi-layer ceramic capacitor which meets JIS Y-class B-characteristic with respect to a capacitance variation depending on temperature changes (a temperature coefficient of capacitance) was prepared according to the following method.

The starting materials, viz. lead oxide (PbO), strontium carbonate ($SrCO_3$), barium carbonate ($BaCO_3$), zinc oxide (ZnO), niobium oxide ($Nb_2O_5$), titanium oxide ($TiO_2$) and copper oxide (CuO) all chemically pure grade, were used. After compensating as to pure contents, they were weighed out to compose a substance represented by the following formula:

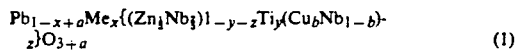

$$Pb_{1-x+a}Me_x\{(Zn_{\frac{1}{3}}Nb_{\frac{2}{3}})_{1-y-z}Ti_y(Cu_bNb_{1-b})_z\}O_{3+a} \quad (1)$$

wherein Me is at least one element selected from Sr and Ba; x, y, z, a and b may be optional values.

They were mixed in a ball mill with zirconia 4 mmΦ ball and distilled water for 17 hours. Thereafter, the mixture was dried and charged into a crucible made of alumina which is closed by an alumina closure and then calcined at 750°~900° C. The calcined mixture was crushed and ground in a ball mill for 17 hours by using the same solvent and balls as the above.

To the sufficiently dried dielectric powder, 5 wt. % of polyvinyl butyral resin with 70 wt. % of a solvent based on the dielectric powder weight was added and mixed in a ball mill. The resulting mixture was made into a sheet form by a doctor-blade method.

$Cu_2O$ powder having an average particle size of 0.8 μm was mixed with 0.5 wt. % of ethylcellulose and 25 wt. % of a solvent based on $Cu_2O$ weight to obtain an electrode paste. The paste was printed on the dielectric sheet by means of a screen printing. The printed sheet was laminated and then was cut into a predetermined size. The number of dielectric layers was set to 20.

The laminated body thus obtained was heated for 6 hours at 500° C. and organic components were burned out. Thereafter, the laminated body was heated in a $N_2$ gas flow containing 1% of $H_2$ for 8 hours at 450° C. and the internal electrode thereof was reduced.

Sintering was carried out by charging the laminated body into a magnesia vessel together with a large volume of the calcinated dielectric powder and also controlling an oxygen partial pressure in an atmosphere so that the internal electrode can not be oxidized absolutely by a gas supply of $CO_2$, CO, $H_2$, $O_2$, $N_2$ and the like and then maintaining a predetermined temperature for 2 hours. As the sintering temperature is varied depending on the composition of the calcined dielectric powder, it is prefered to choose a temperature in which a largest density can be obtained when the pressed body is fired at various temperatures.

500 pieces of ceramic body were produced in one sintering process. On the ends of the resulting ceramic bodies, a Cu paste was baked for an external electode to form a multi-layer capacitor.

Size of the multi-layers capacitor is 3.2×1.6×0.9 mm, the thickness of the electrode layers is about 2 μm and each thickness of the dielectric layers is about 20 μm.

The capacitance and tanδ (the dielectric loss) of the multi-layer capacitor were measured under the conditions of 1 V and 1 kHz. The insulated resistivity was measured after one minute when 20 V was applied. An effective area of the electrode and a thickness of the dielectric layer were measured after polishing the capacitor and then the dielectric constant and insulation resistivity of the dielectric layer were calculated. Each of the properties was determined from an average value of those for good products.

In the below Table 1, there are shown x, y, z, a and b values of the dielectric composition; Optimum sintering temperature; Dielectric constant of the dielectric layer at 20° C.; tanδ; Resistivity; temperature change ratio of the dielectric constant.

As shown in the Table 1, the compositions without the polygon A, B, C, D, E scope shown in FIG. 1 were not practical for ceramic capacitor materials since they lack at least one condition of (1) the sintering temperature is below 1000° C., (2) the dielectric constant is above 2000, (3) a resistivity is above $10^{+12}$ Ω cm and (4) the temperature change ratio of capacitance meet the YB characteristics of JIS. Then the comparative compositions are excluded from the scope of the present invention.

It is also taught from the data in the Table 1 the fact that the sintering temperature can be lowered and an insulation resistivity can be increased by making an excess content (a) of A site in the perovskite phase represented by the formula: $A_{1+a}BO_3$ of the dielectric layer to be above 0. Furthermore, it is allowable to add any other elements not listed in the claims as long as the resultant temperature coefficient of capacitance still meets the YB characteristic of JIS.

TABLE 1

| No. | Me | Composition x | y | z | a | b | Optimum Sintering Temperature (°C.) | ε | tan δ % | Insulation Resistivity $10^{12}$Ωcm | ε/ε (20° C.) −25° C. % | +85° C. % |
|---|---|---|---|---|---|---|---|---|---|---|---|---|
| 1 # | Sr | 0.06 | 0.15 | 0.02 | 0.02 | 0.333 | 860 | 2100 | 0.70 | 1.0 | −12 | −11 |
| 2 | Sr | 0.07 | 0.15 | 0.02 | 0.02 | 0.333 | 860 | 2000 | 0.70 | 1.5 | −9 | −9 |
| 3 | Sr | 0.07 | 0.07 | 0.02 | 0.02 | 0.333 | 920 | 2050 | 0.80 | 1.2 | −9 | −8 |
| 4 # | Sr | 0.1 | 0.18 | 0.02 | 0.02 | 0.333 | 880 | 4300 | 0.35 | 3.0 | −7 | −11 |
| 5 # | Sr | 0.1 | 0.12 | 0.003 | 0.02 | 0.333 | 960 | 4000 | 0.25 | 7.5 | −12 | −13 |
| 6 | Sr | 0.1 | 0.12 | 0.006 | 0.02 | 0.333 | 960 | 3750 | 0.30 | 5.5 | −8 | −9 |
| 7 | Sr | 0.1 | 0.12 | 0.02 | 0.02 | 0.333 | 900 | 3550 | 0.50 | 2.0 | −7 | −7 |
| 8 | Ba | 0.1 | 0.12 | 0.02 | 0.02 | 0.333 | 920 | 3900 | 0.65 | 2.0 | −8 | −8 |
| 9 | Sr | 0.1 | 0.12 | 0.12 | 0.02 | 0.333 | 840 | 3400 | 0.70 | 1.0 | −6 | −6 |
| 10 # | Sr | 0.1 | 0.12 | 0.14 | 0.02 | 0.333 | 840 | 3150 | 0.90 | 0.2 | −5 | −6 |
| 11 # | Sr | 0.1 | 0.06 | 0.02 | 0.02 | 0.333 | 920 | 1950 | 0.60 | 1.5 | −7 | −8 |
| 12 | Sr | 0.16 | 0.22 | 0.02 | 0.02 | 0.333 | 900 | 4050 | 0.20 | 15 | −5 | −6 |

TABLE 1-continued

| No. | Composition | | | | | | Optimum Sintering Temperature (°C.) | Dielectric Properties | | | $\epsilon/\epsilon$ (20° C.) | |
|---|---|---|---|---|---|---|---|---|---|---|---|---|
| | Me | x | y | z | a | b | | $\epsilon$ | tan δ % | Insulation Resistivity $10^{12}\Omega$cm | −25° C. % | +85° C. % |
| 13 # | Sr | 0.16 | 0.15 | 0.02 | −0.01 | 0.333 | 1020 | 4850 | 0.60 | 6.0 | −12 | −13 |
| 14 | Sr | 0.16 | 0.15 | 0.02 | 0 | 0.333 | 980 | 4150 | 0.55 | 4.5 | −10 | −9 |
| 15 | Sr | 0.16 | 0.15 | 0.02 | 0.02 | 0.333 | 940 | 3650 | 0.30 | 12 | −4 | −5 |
| 16 | Ba | 0.16 | 0.15 | 0.02 | 0.02 | 0.333 | 960 | 4050 | 0.45 | 13 | −7 | −7 |
| 17 | Sr | 0.16 | 0.15 | 0.02 | 0.1 | 0.333 | 920 | 3200 | 0.15 | 1.0 | −4 | −4 |
| 18 # | Sr | 0.16 | 0.15 | 0.02 | 0.12 | 0.333 | 920 | 3050 | 0.15 | 0.3 | −3 | −4 |
| 19 | Sr | 0.16 | 0.07 | 0.02 | 0.02 | 0.333 | 980 | 2150 | 0.35 | 10 | −4 | −5 |
| 20 # | Sr | 0.2 | 0.24 | 0.02 | 0.02 | 0.333 | 940 | 3800 | 0.10 | 30 | −3 | −12 |
| 21 # | Sr | 0.2 | 0.18 | 0.444 | 0.02 | 0.015 | 1020 | 3650 | 0.05 | 40 | −8 | −11 |
| 22 | Sr | 0.2 | 0.18 | 0.333 | 0.02 | 0.02 | 1000 | 3600 | 0.10 | 35 | −8 | −9 |
| 23 | Sr | 0.2 | 0.18 | 0.02 | 0.02 | 0.333 | 960 | 2600 | 0.20 | 25 | −3 | −8 |
| 24 | Ba | 0.2 | 0.18 | 0.02 | 0.02 | 0.333 | 960 | 3050 | 0.30 | 20 | −5 | −9 |
| 25 | Sr | 0.2 | 0.18 | 0.007 | 0.02 | 0.95 | 940 | 2400 | 0.35 | 11 | −3 | −7 |
| 26 # | Sr | 0.2 | 0.12 | 0.02 | 0.02 | 0.333 | 1020 | 1800 | 0.30 | 20 | −3 | −7 |
| 27 | Sr | 0.24 | 0.24 | 0.02 | 0.02 | 0.333 | 980 | 2100 | 0.05 | 35 | −1 | −10 |

: comparative example

EXAMPLE 2

The composition herein is characterized in that a part of Cu component in the perovskite of the dielectric layer was substituted by Mn.

A dielectric powder was prepared to have a composition represented by the following formula:

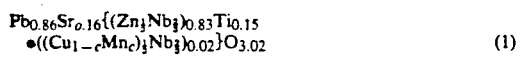

$$Pb_{0.86}Sr_{0.16}\{(Zn_{\frac{1}{3}}Nb_{\frac{2}{3}})_{0.83}Ti_{0.15} \bullet((Cu_{1-c}Mn_c)_{\frac{1}{3}}Nb_{\frac{2}{3}})_{0.02}\}O_{3.02} \quad (1)$$

wherein c is optional and therefrom a multi-layer capacitor was made by the same method as Example 1. Evaluation tests on various properties of the resultant capacitor were carried out by the same method as Example 1.

In the below Table 2, there are shown a substituted amount (c) of Mn and each value of various properties.

As shown in the Table 2, an insulation resistivity can be increased by subsituituting a part of Cu component in the perovskite of the dielectric layer with Mn. However, as the content of Mn becomes over 85%, a temperature change ratio of capacitance becomes too large to meet the YB characteristics of JIS. Therefore, such compositions are excluded from the present invention. Furthermore, it is allowable to add any other elements not listed in the claims as long as a resultant temperature coefficient of capacitance still meets the YB characteristic of JIS.

pensation as to pure contents, they were measured in a amount to form a substance represented by the following formula:

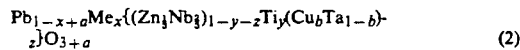

$$Pb_{1-x+a}Me_x\{(Zn_{\frac{1}{3}}Nb_{\frac{2}{3}})_{1-y-z}Ti_y(Cu_bTa_{1-b})_z\}O_{3+a} \quad (2)$$

wherein Me is at least one element selected from Sr and Ba; x, y, z, a and b may be optional values.

Various of the properties of the resultant capacitor were measured according to the same method and condition and each typical data thereof was determined from an average value of those for good products.

In the below Table 3, there are shown x, y, z, a and b values of the dielectric composition; Optimum sintering temperature; Dielectric constant of the dielectric layer at 20° C.; tanδ; Resistivity; Temperature change ratio of the dielectric constant.

As shown in the Table 3, the compositions without the polygon A, B, C, D, E scope shown in FIG. 3 were not practical for ceramic capacitor materials since they lack at least one condition of (1) a sintering temperature is below 1000° C., (2) a dielectric constant is above 2000, (3) a resistivity is above $10^{+12}$ Ω cm and (4) a temperature coefficient of capacitance meets the YB characteristics of JIS. Then the compositions are excluded from the scope of the present invention.

It is also taught from the data in the Table 3 the fact

TABLE 2

| No. | Composition | Optimum Sintering Temperature (°C.) | Dielectric Properties | | | $\epsilon/\epsilon$ (20° C.) | |
|---|---|---|---|---|---|---|---|
| | | | $\epsilon$ | tan δ % | Insulation Resistivity $10^{12}\Omega$cm | −25° C. % | +85° C. % |
| 1 | 0.0 | 940 | 3650 | 0.30 | 12 | −4 | −5 |
| 2 | 0.1 | 940 | 3850 | 0.25 | 20 | −5 | −7 |
| 3 | 0.3 | 940 | 4050 | 0.25 | 25 | −6 | −8 |
| 4 | 0.85 | 960 | 4150 | 0.20 | 30 | −8 | −9 |
| 5 # | 0.90 | 960 | 4300 | 0.20 | 35 | −11 | −14 |

: comparative example

EXAMPLE 3

According to the same procedure as Example 1, a multi-layer capacitor was prepared.

The starting materials, viz. lead oxide(PbO), strontium carbonate(SrCO₃), barium carbonate(BaCO₃), zinc oxide(ZnO), niobium oxide(Nb₂O₅), titanium oxide(TiO₂), tantalum oxide(Ta₂O₅) and copper oxide (CuO) all chemically pure grade, were used. After comthat a sintering temperature can be lowered and an insulation resistivity can be increased by making an excess content (a) of A site in the perovskite phase represented by the formula: $A_{1+a}BO_3$ of the dielectric layer to be above 0. Furthermore, it is allowable to add any other elements not listed in the claims as long as the resultant temperature coefficient of capacitance still meets the YB characteristics of JIS.

not listed in the claims as long as a resultant temperature coefficient of capacitance still meets the YB characteris-

TABLE 3

| No. | Me | Composition x | y | z | a | b | Optimum Sintering Temperature (°C.) | Dielectric Properties ε | tan δ % | Insulation Resistivity $10^{12}\Omega$cm | Δ ε/ε (20° C.) −25° C. % | +85° C. % |
|---|---|---|---|---|---|---|---|---|---|---|---|---|
| 1 # | Sr | 0.06 | 0.14 | 0.02 | 0.02 | 0.333 | 880 | 2300 | 0.85 | 0.6 | −14 | −12 |
| 2 | Sr | 0.07 | 0.14 | 0.02 | 0.02 | 0.333 | 880 | 2200 | 0.80 | 1.2 | −10 | −9 |
| 3 | Sr | 0.07 | 0.08 | 0.02 | 0.02 | 0.333 | 940 | 2150 | 0.85 | 1.2 | −9 | −9 |
| 4 # | Sr | 0.1 | 0.18 | 0.02 | 0.02 | 0.333 | 900 | 4650 | 0.50 | 2.5 | −9 | −13 |
| 5 # | Sr | 0.1 | 0.12 | 0.003 | 0.02 | 0.333 | 1000 | 4400 | 0.30 | 6.5 | −16 | −13 |
| 6 | Sr | 0.1 | 0.12 | 0.006 | 0.02 | 0.333 | 980 | 3850 | 0.40 | 5.0 | −9 | −10 |
| 7 | Sr | 0.1 | 0.12 | 0.02 | 0.02 | 0.333 | 920 | 3650 | 0.50 | 1.5 | −8 | −8 |
| 8 | Ba | 0.1 | 0.12 | 0.02 | 0.02 | 0.333 | 940 | 4050 | 0.80 | 1.8 | −9 | −8 |
| 9 | Sr | 0.1 | 0.12 | 0.12 | 0.02 | 0.333 | 880 | 3550 | 0.75 | 1.0 | −7 | −6 |
| 10 # | Sr | 0.1 | 0.12 | 0.14 | 0.02 | 0.333 | 860 | 3200 | 1.20 | 0.15 | −6 | −7 |
| 11 # | Sr | 0.1 | 0.07 | 0.02 | 0.02 | 0.333 | 960 | 2100 | 0.85 | 1.0 | −9 | −10 |
| 12 | Sr | 0.16 | 0.22 | 0.02 | 0.02 | 0.333 | 900 | 4050 | 0.25 | 12 | −6 | −6 |
| 13 # | Sr | 0.16 | 0.14 | 0.02 | −0.01 | 0.333 | 1040 | 5000 | 0.70 | 0.6 | −14 | −15 |
| 14 | Sr | 0.16 | 0.14 | 0.02 | 0 | 0.333 | 980 | 4200 | 0.60 | 4.0 | −10 | −10 |
| 15 | Sr | 0.16 | 0.14 | 0.02 | 0.02 | 0.333 | 960 | 3750 | 0.40 | 10 | −4 | −4 |
| 16 | Ba | 0.16 | 0.14 | 0.02 | 0.02 | 0.333 | 980 | 4100 | 0.45 | 10 | −7 | −8 |
| 17 | Sr | 0.16 | 0.14 | 0.02 | 0.1 | 0.333 | 940 | 3300 | 0.25 | 1.0 | −5 | −6 |
| 18 # | Sr | 0.16 | 0.14 | 0.02 | 0.12 | 0.333 | 960 | 3250 | 0.15 | 0.2 | −4 | −4 |
| 19 | Sr | 0.18 | 0.08 | 0.02 | 0.02 | 0.333 | 980 | 2250 | 0.45 | 8 | −4 | −6 |
| 20 # | Sr | 0.21 | 0.23 | 0.02 | 0.02 | 0.333 | 980 | 4050 | 0.25 | 22 | −2 | −19 |
| 21 # | Sr | 0.21 | 0.18 | 0.444 | 0.02 | 0.015 | 1040 | 3800 | 0.15 | 33 | −10 | −13 |
| 22 | Sr | 0.21 | 0.18 | 0.333 | 0.02 | 0.02 | 1000 | 3750 | 0.20 | 30 | −9 | −9 |
| 23 | Sr | 0.21 | 0.18 | 0.02 | 0.02 | 0.333 | 980 | 2700 | 0.30 | 20 | −4 | −8 |
| 24 | Ba | 0.21 | 0.18 | 0.02 | 0.02 | 0.333 | 980 | 3150 | 0.45 | 13 | −7 | −9 |
| 25 | Sr | 0.21 | 0.18 | 0.007 | 0.02 | 0.95 | 960 | 2550 | 0.40 | 7 | −4 | −9 |
| 26 # | Sr | 0.21 | 0.12 | 0.02 | 0.02 | 0.333 | 1040 | 2000 | 0.35 | 15 | −6 | −8 |
| 27 | Sr | 0.24 | 0.22 | 0.02 | 0.02 | 0.333 | 1000 | 2250 | 0.10 | 25 | −2 | −10 |

: comparative example tic of JIS.

TABLE 4

| No. | Composition (°C.) | Optimum Sintering Temperature (°C.) | Dielectric Properties ε | tan δ (°C.) | Insulation Resistivity $10^{12}\Omega$cm | ε/ε (20° C.) −25° C. % | +85° C. % |
|---|---|---|---|---|---|---|---|
| 1 | 0.0 | 960 | 3750 | 0.40 | 10 | −4 | −4 |
| 2 | 0.1 | 960 | 3900 | 0.35 | 15 | −5 | −6 |
| 3 | 0.3 | 960 | 4150 | 0.30 | 18 | −7 | −8 |
| 4 | 0.85 | 980 | 4200 | 0.30 | 27 | −9 | −9 |
| 5 # | 0.90 | 1000 | 4400 | 0.25 | 30 | −12 | −15 |

: comparative example

EXAMPLE 4

The composition herein is characterized in that a part the Cu component in the perovskite of the dielectric layer was substituted by Mn.

A dielectric powder was prepared to have a composition represented by the following formula:

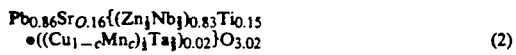

$$Pb_{0.86}Sr_{0.16}\{(Zn_{\frac{1}{3}}Nb_{\frac{2}{3}})_{0.83}Ti_{0.15} \bullet((Cu_{1-c}Mn_c)_{\frac{1}{3}}Ta_{\frac{2}{3}})_{0.02}\}O_{3.02} \quad (2)$$

wherein c is optional and therefrom a multi-layer capacitor was made by the same method as Example 3. Evaluation tests on various properties of the resultant capacitor were carried out by the same method as Example 1.

In the below Table 4, there are shown a substituted amount (c) of Mn and each value of various properties.

As shown in the Table 4, an insulation resistivity can be increased by subsitituting a part of Cu component in the perovskite of the dielectric layer with Mn. However, as the content of Mn becomes over 85%, the temperature change ratio of capacitance becomes too large to meet the YB characteristics of JIS. Therefore, such compositions are excluded from the present invention. Furthermore, it is allowable to add any other elements

EXAMPLE 5

According to the same procedure as Example 1, a multi-layer capacitor was prepared.

The starting materials, viz. lead oxide (PbO), strontium carbonate (SrCO₃), barium carbonate (BaCO₃), zinc oxide (ZnO), niobium oxide (Nb₂O₅), titanium oxide (TiO₂), tungsten oxide (W₂O₃) and copper oxide (CuO) all chemically pure grade, were used. After compensation as to pure contents, they were measured in a amount to form a substance represented by the following formula:

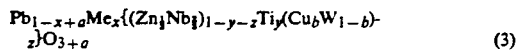

$$Pb_{1-x+a}Me_x\{(Zn_{\frac{1}{3}}Nb_{\frac{2}{3}})_{1-y-z}Ti_y(Cu_bW_{1-b})_z\}O_{3+a} \quad (3)$$

wherein Me is at least one element selected from Sr and Ba; x, y, z, a and b may be optional values.

Various of the properties of the resultant capacitor were measured according to the same method and condition and each typical data thereof was determined from an average value of those for good products.

In the below Table 5, there are shown x, y, z, a and b values of the dielectric composition; Optimum sintering temperature; Dielectric constant of the dielectric layer at 20° C.; tan δ; Resistivity; temperature change ratio of the dielectric constant.

As shown in the Table 5, the compositions without the polygon A, B, C, D, E scope shown in FIG. 2 were not practical for ceramic capacitor materials since they lack at least one condition of (1) the sintering temparature is below 1000° C., (2) the dielectric constant is above 2000, (3) the resistivity is above $10^{+12}$ Ω cm and (4) the temparature coefficient of capacitance meets the YB characteristics of JIS. Then the compositions are excluded from the scope of the present invention.

It is also taught from the data in the Table 5 the fact that a sintering temperature can be lowered and an insulation resistivity can be increased by making an excess content (a) of A site in the perovskite phase represented by the formula: $A_{1+a}BO_3$ of the dielectric layer to be above 0. Furthermore, it is allowable to add any other elements not listed in the claims as long as the resultant temperature coefficient of capacitance still meets the YB characteristics of JIS.

wherein c is optional and therefrom a multi-layer capacitor was made by the same metod as Example 5. Evaluation tests on various properties of the resultant capacitor were carried out by the same method as in Example 1.

In the below Table 6, there are shown a substituted amount (c) of Mn and each value of various properties.

As shown in the Table 6, an insulation resistivity can be increased by subsutituting a part of Cu component in the perovskite of the dielectric layer with Mn. However, as the content of Mn becomes over 85%, a temperature change ratio of capacitance becomes too large to meet the YB characteristics of JIS. Therefore, such compositions are excluded from the present invention. Furthermore, it is allowable to add any other elements not listed in the claims as long as the resultant temperature coefficient of capacitance still meets the YB characteristics of JIS.

Apparent from the above description, by use of the multi-layer capacitor in accordance with the present invention, the material cost for an electrode is remarkably lowered and superior properties can be obtained

TABLE 5

| No. | Me | Composition x | y | z | a | b | Optimum Sintering Temperature (°C.) | Dielectric Properties ε | tan δ % | Insulation Resistivity $10^{12}$Ωcm | Δ ε/ε (20° C.) −25° C. % | +85° C. % |
|---|---|---|---|---|---|---|---|---|---|---|---|---|
| 1 # | Sr | 0.06 | 0.16 | 0.02 | 0.02 | 0.5 | 840 | 2200 | 0.60 | 0.8 | −12 | −10 |
| 2 | Sr | 0.07 | 0.16 | 0.02 | 0.02 | 0.5 | 840 | 2100 | 0.60 | 1.2 | −9 | −8 |
| 3 | Sr | 0.07 | 0.09 | 0.02 | 0.02 | 0.5 | 880 | 2050 | 0.80 | 1.0 | −8 | −7 |
| 4 # | Sr | 0.1 | 0.19 | 0.02 | 0.02 | 0.5 | 860 | 4000 | 0.30 | 2.0 | −8 | −12 |
| 5 # | Sr | 0.1 | 0.14 | 0.002 | 0.02 | 0.5 | 940 | 3950 | 0.35 | 7.0 | −11 | −13 |
| 6 | Sr | 0.1 | 0.14 | 0.004 | 0.02 | 0.5 | 920 | 3650 | 0.35 | 4.5 | −7 | −8 |
| 7 | Sr | 0.1 | 0.14 | 0.02 | 0.02 | 0.5 | 860 | 3500 | 0.40 | 1.8 | −7 | −6 |
| 8 | Ba | 0.1 | 0.14 | 0.02 | 0.02 | 0.5 | 860 | 3750 | 0.60 | 2.0 | −8 | −7 |
| 9 | Sr | 0.1 | 0.14 | 0.08 | 0.02 | 0.5 | 820 | 3250 | 0.75 | 1.2 | −5 | −4 |
| 10 # | Sr | 0.1 | 0.14 | 0.10 | 0.02 | 0.5 | 820 | 3000 | 1.02 | 0.2 | −4 | −5 |
| 11 # | Sr | 0.1 | 0.08 | 0.02 | 0.02 | 0.5 | 880 | 1900 | 0.50 | 1.0 | −8 | −7 |
| 12 | Sr | 0.16 | 0.22 | 0.02 | 0.02 | 0.5 | 880 | 3900 | 0.20 | 12 | −6 | −6 |
| 13 # | Sr | 0.16 | 0.16 | 0.02 | −0.01 | 0.5 | 1020 | 4650 | 0.75 | 0.8 | −11 | −13 |
| 14 | Sr | 0.16 | 0.16 | 0.02 | 0 | 0.5 | 960 | 4050 | 0.55 | 4.0 | −9 | −9 |
| 15 | Sr | 0.16 | 0.16 | 0.02 | 0.02 | 0.5 | 900 | 3400 | 0.30 | 8 | −4 | −5 |
| 16 | Ba | 0.16 | 0.16 | 0.02 | 0.02 | 0.5 | 920 | 3950 | 0.45 | 11 | −8 | −7 |
| 17 | Sr | 0.16 | 0.16 | 0.02 | 0.1 | 0.5 | 880 | 3050 | 0.20 | 1.2 | −3 | −4 |
| 18 # | Sr | 0.16 | 0.16 | 0.02 | 0.12 | 0.5 | 880 | 2800 | 0.20 | 0.2 | −3 | −3 |
| 19 | Sr | 0.19 | 0.09 | 0.02 | 0.02 | 0.5 | 940 | 2100 | 0.30 | 7 | −5 | −6 |
| 20 # | Sr | 0.22 | 0.23 | 0.02 | 0.02 | 0.5 | 900 | 3550 | 0.10 | 25 | −2 | −14 |
| 21 # | Sr | 0.22 | 0.2 | 0.667 | 0.02 | 0.015 | 1020 | 3450 | 0.05 | 30 | −7 | −13 |
| 22 | Sr | 0.22 | 0.2 | 0.5 | 0.02 | 0.02 | 980 | 3500 | 0.10 | 25 | −7 | −10 |
| 23 | Sr | 0.22 | 0.2 | 0.02 | 0.02 | 0.5 | 940 | 2400 | 0.30 | 19 | −3 | −7 |
| 24 | Ba | 0.22 | 0.2 | 0.02 | 0.02 | 0.5 | 960 | 2850 | 0.20 | 15 | −6 | −8 |
| 25 | Sr | 0.22 | 0.2 | 0.011 | 0.02 | 0.95 | 900 | 2250 | 0.25 | 9 | −3 | −7 |
| 26 # | Sr | 0.22 | 0.14 | 0.02 | 0.02 | 0.5 | 1020 | 1600 | 0.35 | 17 | −3 | −8 |
| 27 | Sr | 0.24 | 0.22 | 0.02 | 0.02 | 0.5 | 940 | 2050 | 0.10 | 30 | 0 | −9 |

: comparative example

EXAMPLE 6

The composition herein is characterized in that a part of Cu component in the perovskite of the dielectric layer was substituted by Mn.

A dielectric powder was prepared to have a composition represented by the following formula:

$$Pb_{0.86}Sr_{0.16}\{(Zn_{\frac{1}{3}}Nb_{\frac{2}{3}})_{0.83}Ti_{0.15} \bullet ((Cu_{1-c}Mn_c)_{\frac{1}{3}}W_{\frac{2}{3}})_{0.02}\}O_{3.02} \quad (3)$$

especially in a high frequency circuit. Further, use of Pb based dielectric materials makes it possible to get dielectric layers thinner for multi-layer capacitors, so that there can be provided a small sized capacitor having larger capacitance for replacement of conventional electrolytic capacitors. Furthermore, the temperature coefficient of capacitance sufficiently meets the YB characteristics of JIS, so that it is use in the circuit field can be expanded further.

TABLE 6

| No. | Composition | Optimum Sintering Temperature (°C.) | Dielectric Properties | | | $\epsilon/\epsilon$ (20° C.) | |
|---|---|---|---|---|---|---|---|
| | | | $\epsilon$ | tan δ % | Insulation Resistivity $10^{12}\Omega cm$ | −25° C. % | +85° C. % |
| 1 | 0.0 | 900 | 3400 | 0.30 | 8 | −4 | −5 |
| 2 | 0.1 | 900 | 3650 | 0.25 | 15 | −4 | −6 |
| 3 | 0.3 | 900 | 3800 | 0.25 | 20 | −5 | −8 |
| 4 | 0.85 | 920 | 3900 | 0.15 | 25 | −7 | −9 |
| 5 # | 0.90 | 920 | 4150 | 0.15 | 30 | −10 | −14 |

\#: comparative example

Figure 1:
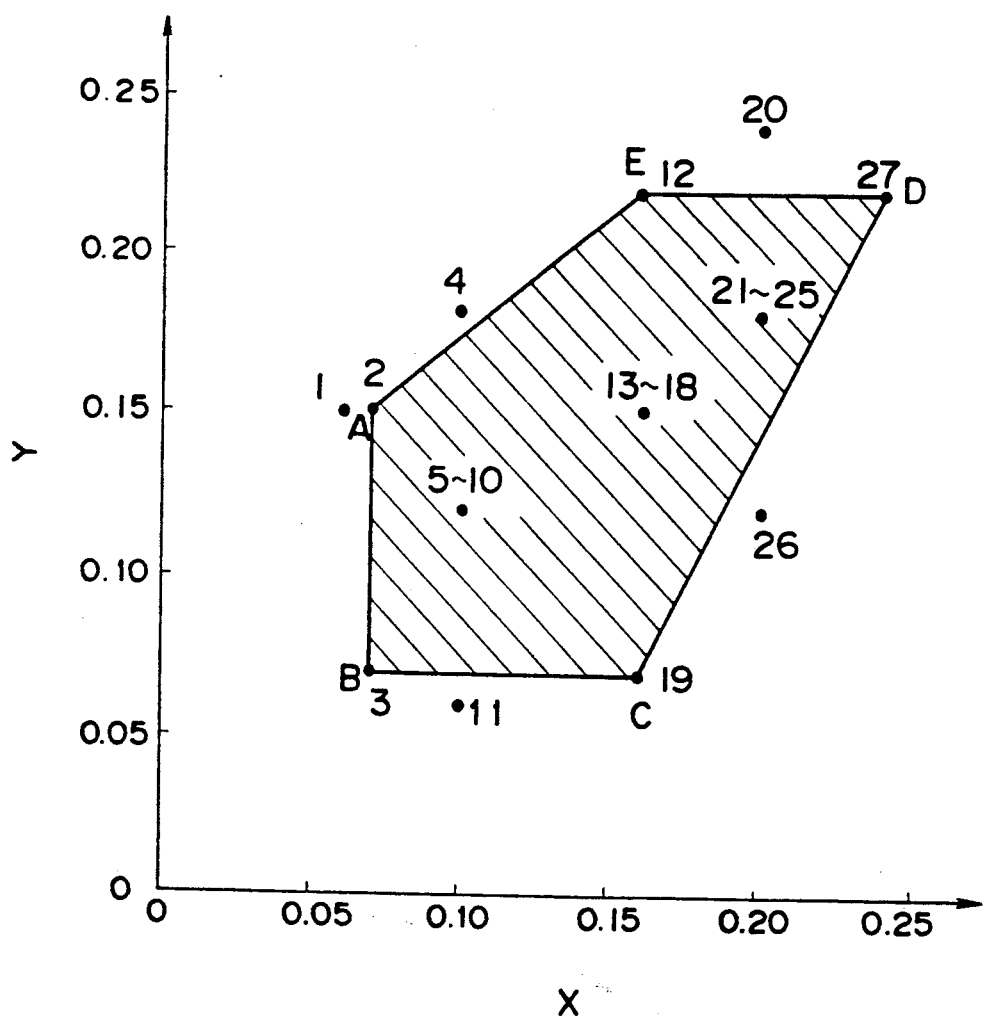

What is claimed is:

1. Dielectric ceramic composition consisting essentially of one or more substances represented by the following formulas:

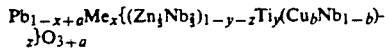
$$Pb_{1-x+a}Me_x\{(Zn_{\frac{1}{3}}Nb_{\frac{2}{3}})_{1-y-z}Ti_y(Cu_bNb_{1-b})_z\}O_{3+a} \quad (1)$$

wherein Me is at least one of Sr and Ba; x and y are within the polygon scope enclosed by 5 points A(x=0.07, y=0.15), B(x=0.07, y=0.07), C(x=0.16, y=0.07), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 1;

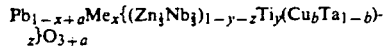
$$Pb_{1-x+a}Me_x\{(Zn_{\frac{1}{3}}Nb_{\frac{2}{3}})_{1-y-z}Ti_y(Cu_bTa_{1-b})_z\}O_{3+a} \quad (2)$$

wherein Me is at least one of Sr and Ba; x and y are within the polygon scope enclosed by 5 points A(x=0.07, y=0.14), B(x=0.07, y=0.08), C(x=0.18, y=0.08), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 3;

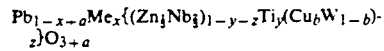
$$Pb_{1-x+a}Me_x\{(Zn_{\frac{1}{3}}Nb_{\frac{2}{3}})_{1-y-z}Ti_y(Cu_bW_{1-b})_z\}O_{3+a} \quad (3)$$

wherein Me is at least one of Sr and Ba; x and y are within the polygon scope enclosed by 5 points A(x=0.07, y=0.16), B(x=0.07, y=0.09), C(x=0.19, y=0.09), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 2.

2. Dielectric ceramic composition according to claim 1, wherein at most 85% of Cu atoms included therein are substituted by Mn atoms.

3. A multi-layer ceramic capacitor principally made up of (a) internal electrode layers mainly containing Cu or Cu alloys and (b) dielectric layers mainly containing at least one ceramic substance represented by the following formulas:

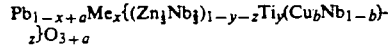
$$Pb_{1-x+a}Me_x\{(Zn_{\frac{1}{3}}Nb_{\frac{2}{3}})_{1-y-z}Ti_y(Cu_bNb_{1-b})_z\}O_{3+a} \quad (1)$$

wherein Me is at least one of Sr and Ba; x and y are within the scope enclosed by 5 points A(x=0.07, y=0.15), B(x=0.07, y=0.09), C(x=0.16, y=0.07), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 1;

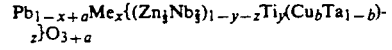
$$Pb_{1-x+a}Me_x\{(Zn_{\frac{1}{3}}Nb_{\frac{2}{3}})_{1-y-z}Ti_y(Cu_bTa_{1-b})_z\}O_{3+a} \quad (2)$$

wherein Me is at least one of Sr and Ba; x and y are within the polygon scope enclosed by 5 points A(x=0.07, y=0.14), B(x=0.07, y=0.08), C(x=0.18, y=0.08), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 3

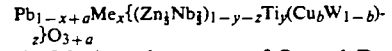
$$Pb_{1-x+a}Me_x\{(Zn_{\frac{1}{3}}Nb_{\frac{2}{3}})_{1-y-z}Ti_y(Cu_bW_{1-b})_z\}O_{3+a} \quad (3)$$

wherein Me is at least one of Sr and Ba; x and y are within the scope enclosed by 5 points A(x=0.07, y=0.16), B(x=0.07, y=0.09), C(x=0.19, y=0.09), D(x=0.24, y=0.22) and E(x=0.16, y=0.22); and $0 \leq a \leq 0.1$, $0.02 \leq b \leq 1.0$, $0.002 \leq bz \leq 0.04$ as shown in FIG. 2.

4. A multi layer ceramic capacitor according to claim 3, wherein at most 85% of Cu atoms included in the dielectric layers are substituted by Mn atoms.

* * * * *